(12) United States Patent
Kaufmann et al.

(10) Patent No.: US 9,844,713 B1
(45) Date of Patent: Dec. 19, 2017

(54) SOUND ABSORBING REBOUNDING DEVICE

(71) Applicant: Dream Dribble, LLC, Woodmere, NY (US)

(72) Inventors: Dylan S. Kaufmann, Woodmere, NY (US); Eric A. Braunstein, Cedarhust, NY (US)

(73) Assignee: Dream Dribble, LLC, New York, NY (US)

( * ) Notice: Subject to any disclaimer, the term of this patent is extended or adjusted under 35 U.S.C. 154(b) by 0 days.

(21) Appl. No.: 15/494,771

(22) Filed: Apr. 24, 2017

Related U.S. Application Data

(63) Continuation of application No. 15/382,670, filed on Dec. 18, 2016, now abandoned.

(51) Int. Cl.
 *A63B 69/00* (2006.01)
 *G09B 19/00* (2006.01)

(52) U.S. Cl.
 CPC ...... *A63B 69/0071* (2013.01); *G09B 19/0038* (2013.01); *A63B 2209/14* (2013.01); *A63B 2210/50* (2013.01); *A63B 2243/0037* (2013.01)

(58) Field of Classification Search
 CPC .... A63B 5/11; A63B 6/00; A63B 5/08; A63B 69/0071; A63B 5/09
 USPC .......... 473/449, 434, 435, 447; 273/395–396
 See application file for complete search history.

(56) References Cited

U.S. PATENT DOCUMENTS

| | | | |
|---|---|---|---|
| 2,275,179 A | 3/1942 | Heil | |
| 3,368,814 A | 2/1968 | Kolwicz | |
| 5,016,891 A | 5/1991 | Nelson | |
| 5,201,526 A | 4/1993 | Ketcham | |
| 5,566,948 A | 10/1996 | Kidd | |
| 8,002,282 B1 | 8/2011 | Koski | |
| 8,807,568 B1 | 8/2014 | Ruder | |
| 2003/0236139 A1* | 12/2003 | Jensen | A63B 69/0002 473/434 |
| 2013/0023359 A1* | 1/2013 | Goodman | A63B 69/0071 473/434 |
| 2016/0199718 A1* | 7/2016 | Holland | A63B 69/0071 473/435 |

* cited by examiner

*Primary Examiner* — Aarti B Berdichevsky
*Assistant Examiner* — Rayshun Peng
(74) *Attorney, Agent, or Firm* — Pearl Cohen Zedek Latzer Baratz LLP

(57) ABSTRACT

A sound absorbing rebounding device provides a way for a person to practice dribbling a basketball while minimizing sounds and vibrations emanating from the basketball and the device during such practice. The device has a frame, a rebounding surface that mimics or replaces the hard surface on which a user would normally dribble to cause a rebounding effect, and a base to separate or space the rebounding surface from the floor, so that sounds and vibrations during bouncing of the basketball are not transferred to the surface on which the device is resting. The frame shape allows the user to practice dribbling in all different directions around the user's body placed relative to the user's legs, such as a T, an H, or the number 8. The device may be collapsible via hinges placed within its frame that allow the device to be collapsed in varying degrees of compactness.

30 Claims, 11 Drawing Sheets

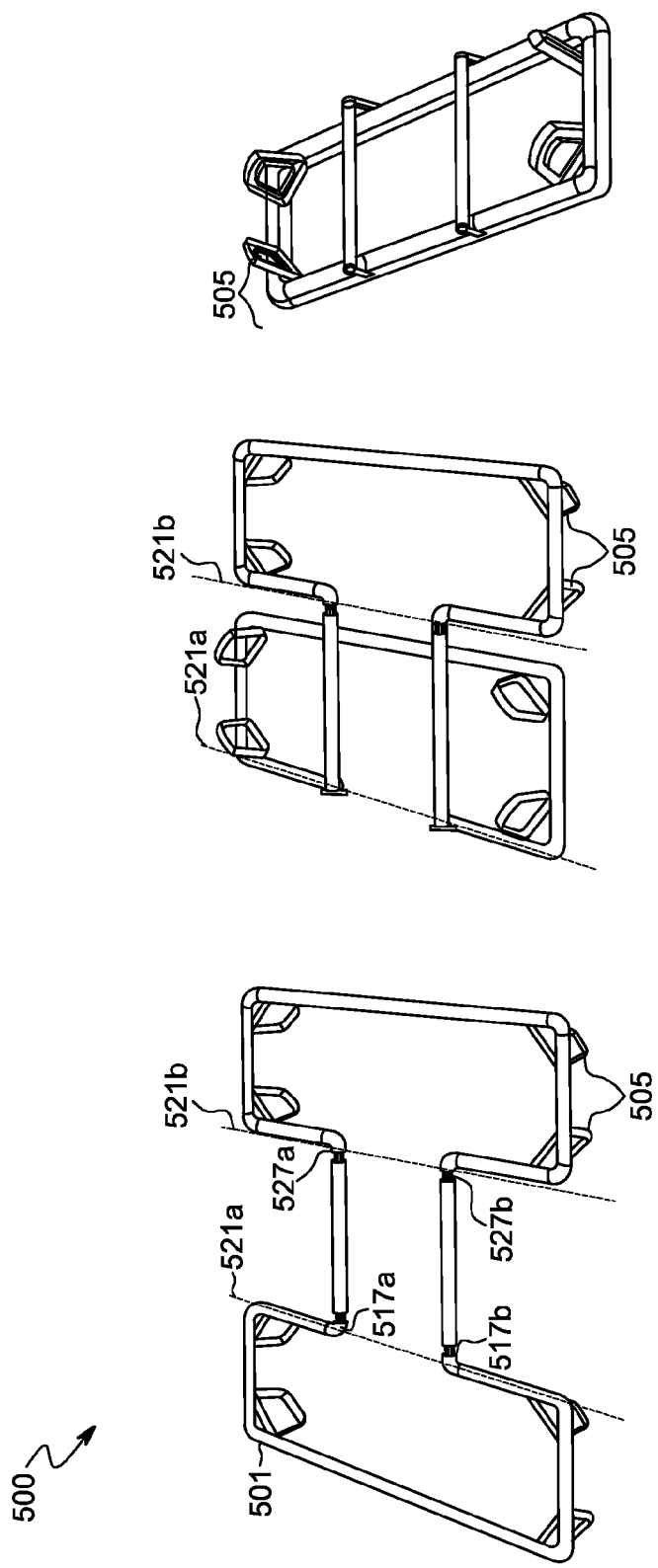

SOUND ABSORBING REBOUNDING DEVICE

CROSS REFERENCE TO RELATED APPLICATIONS

The present application is a continuation of U.S. patent application Ser. No. 15/382,670, filed Dec. 18, 2016, and entitled "SOUND ABSORBING REBOUNDING DEVICE".

FIELD OF THE INVENTION

The present invention relates to a sound absorbing rebounding device, and, more particularly, to a sound absorbing rebounding device for use in practicing to dribble a basketball.

BACKGROUND OF THE INVENTION

One of the integral aspects to the game of basketball is dribbling. In order to reach one's potential as a basketball player, he/she must become proficient in dribbling the basketball. However, the average basketball player is faced with many difficulties in finding a proper location at which to hone the skill of dribbling. Among the obstacles that may arise in the process of training are poor weather conditions and limited or no access to a gym or other location where dribbling would not cause a disturbance.

Therefore, it is desirable to be able to practice dribbling a basketball in one's own home/apartment. However, there are limited devices in the market today that provide a quiet solution to dribbling at home, while getting the feel of dribbling on a hardwood floor. Due to a lack of sound vibration reducing techniques on many basketball dribbling training devices, such devices must be used outdoors or in a gymnasium, and not at home where use of such devices could disturb nearby residents. Accordingly, the main problem with current dribbling apparatuses is that they are not sound reduced, vibration proof, and designed to be used in one's home or apartment.

It is desirable to provide a sound absorbing rebounding device that addresses the above-identified problems and provides a way for a person to practice dribbling a basketball in a home or apartment.

SUMMARY OF THE INVENTION

According to some embodiments of the present invention, there is provided a sound absorbing rebounding device that provides a way for a person to practice dribbling a basketball in a home/apartment while minimizing sounds and vibrations emanating from the basketball and the device during such practice.

In certain embodiments, the sound absorbing rebounding device has a rebounding surface that mimics or replaces the hard surface on which a user would normally dribble to cause a rebounding effect, wherein such rebounding surface provides the same or similar rebounding effect as would be provided by the hard surface. In some embodiments, the rebounding surface may be an elastic surface that provides an even greater rebounding effect than would be provided by a hard surface, in order to provide the user with enhanced rebounding and better practice at dribbling. In some embodiments, the rebounding surface may provide a lesser rebounding effect than would be provided by a hard surface, in order to provide the user with worse rebounding so as to improve the user's skill at dribbling.

In certain embodiments, the sound absorbing rebounding device has a frame and a base, such as a plurality of legs, that provides a separation or spacing of the rebounding surface from the floor, so that sounds and vibrations emanating from the basketball and the rebounding device during such bouncing of the basketball are not transferred to the floor or other surface on which the device is resting. In some embodiments, the base provides damping or cushioning to absorb vibrations emanating from the rebounding device during bouncing of the basketball. In some embodiments, the base does not interfere with the rebounding effect of the surface. In certain embodiments, the base has a friction surface to prevent the base from sliding on the supporting surface when the ball is bounced on the rebounding surface.

In certain embodiments, a sound absorbing rebounding device is provided comprising a frame enclosing a dribbling area; a base attached to the frame and configured to space the frame from a supporting surface on which the device rests; and a rebounding surface attached to the frame and extending across the dribbling area, wherein the rebounding surface is made from a material which allows a ball, when bounced thereon, to rebound with a reduced amount of noise as compared to when the ball is bounced on an average hardwood floor.

In certain embodiments, the frame of the sound absorbing rebounding device has a shape that allows the user to practice dribbling in all different directions around the user's body when the device is placed relative to the user's legs. In certain embodiments, a portion of the frame is configured to be placed between a user's legs and a portion of the frame is configured to be placed in front of and/or behind the user's legs. In various embodiments, such a device can have a shape like the letter T, the letter H, a closed letter H (similar to the letter B) or the number 8.

In certain embodiments, the sound absorbing rebounding device is collapsible and has hinges placed within its frame to allow the frame to be folded along those hinges. These hinges allow the sound absorbing rebounding device to be collapsed in varying degrees of compactness, depending upon where the hinges are situated within the frame of the sound absorbing rebounding device.

In certain embodiments, the rebounding surface may be configured to provide the ball bounced thereon with an equal returning energy as compared with the ball bounced on an average hardwood floor, a greater returning energy as compared with the ball bounced on an average hardwood floor, or a lower returning energy as compared with the ball bounced on an average hardwood floor.

In certain embodiments, the rebounding surface may comprise a plurality of interlocking elastic cords or an elastic fabric, such as a single piece of material or a composite material. The frame may have a plurality of hooks attached thereto, and the rebounding surface may have a plurality of loops attached to a periphery thereof, such that the rebounding surface can be attached to the frame by attaching the plurality of loops to the plurality of hooks. The plurality of loops may be formed from an elastic material.

In certain embodiments, the device has a plurality of hinges within its frame, wherein the frame is configured to be folded by way of the hinges. In some embodiments, the frame has a T shape, and the hinges are situated in the frame above the elongated horizontal section and below the short vertical section to allow the frame to be folded in half. In some embodiments, the frame has an H shape, the hinges are situated at corners of the frame between the two elongated horizontal sections and the short vertical section to allow the frame to be folded in thirds. In some embodiments, the frame has a T shape, and two of said hinges are situated in the frame above the elongated horizontal section and other of said hinges are situated at corners between the elongated horizontal section and the short vertical section, to allow the frame to be folded into a square.

In certain embodiments, the device's base comprises a plurality of legs. The legs may be configured to be moved from a deployed configuration to a folded configuration in which they are substantially flat against or within the frame.

BRIEF DESCRIPTION OF THE DRAWINGS

The foregoing and other objects, features, and advantages of the present invention, as well as the invention itself, is more fully understood from the following description of various embodiments, when read together with the accompanying drawings.

FIGS. 5A-C are perspective views of the frame of another embodiment of the collapsible sound absorbing rebounding device in successively collapsed states.

Figure 1:
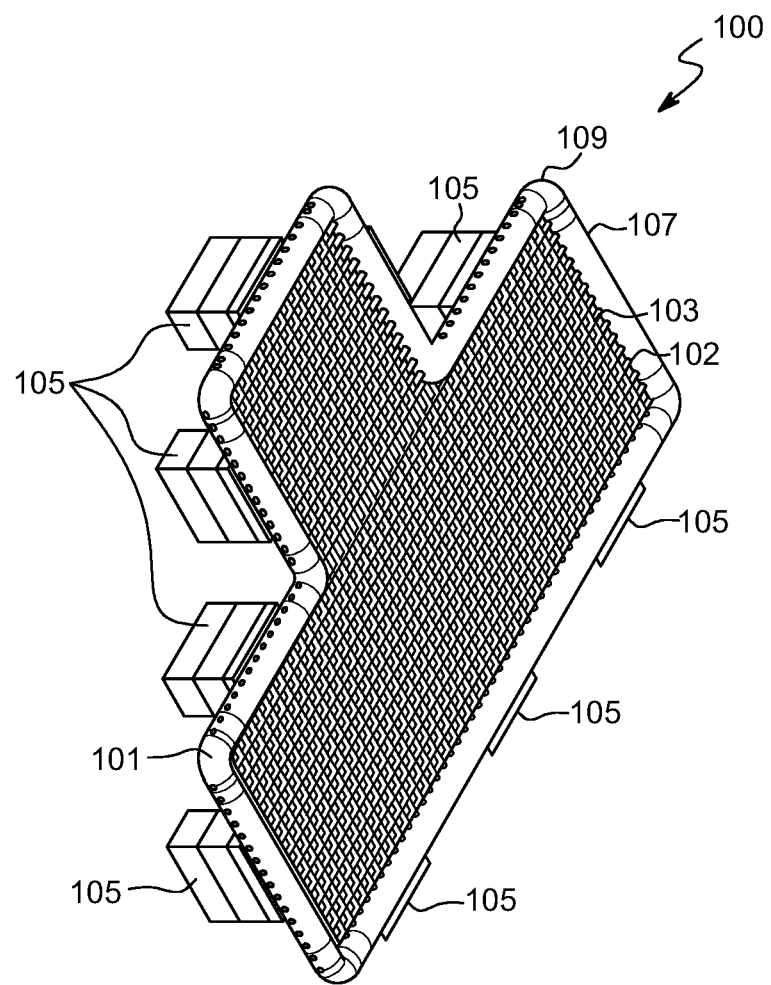
FIG. 1 is a perspective view of a sound absorbing rebounding device, according to one embodiment of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will be apparent to one skilled in the art that the present invention may be practiced without the specific details presented herein. Furthermore, well known features may be omitted or simplified in order not to obscure the present invention.

Reference is made to FIG. 1, which are various views of a sound absorbing rebounding device 100, according to one embodiment of the invention.

As shown in FIG. 1, the sound absorbing rebounding device 100 may have a frame 101, a rebounding surface 103, and a base 105. In certain embodiments, frame 101 forms a periphery around a dribbling area onto which the user bounces the basketball, and rebounding surface 103 extends across the dribbling area within the periphery. Frame 101 may include a plurality of straight struts 107 connected to a plurality of L-shaped corner pieces 109. In some embodiments of the invention, frame 101 is formed from one piece. Rebounding surface 103 may be directly or indirectly attached to frame 101, such as at an inside surface 102 thereof. In certain embodiments, base 105 may be attached to frame 101 at a bottom surface 104 thereof in order to space rebounding surface 103 away from a supporting surface on which device 100 rests.

In some embodiments of the invention, frame 101 may be formed from any hard material, such as plastic or metal, such as steel, iron, aluminum, etc. In some embodiments, frame 101 may be made out of Aluminum alloy. In some embodiments, straight struts 107 may be made out of Aluminum 1345 alloy, and L-shaped corner pieces 109 may be made out of Aluminum 2024 alloy.

In certain embodiments, the dribbling area onto which the basketball is bounced, as bound by frame 101, has a shape that allows the user to practice dribbling in all different directions around the user's body when the device 100 is placed relative to the user's legs. In various embodiments, device 100 can have various configurations, such as without limitation a shape like the letter T, the letter H, or a closed letter H (similar to the letter B or the number 8).

In one embodiment, as shown in FIG. 1, frame 101 may have a T-shape, i.e., with one elongated, straight portion and a shorter, straight portion oriented perpendicularly to the first portion. In this T-shaped embodiment of device 100, frame 101 may have 8 sides. In some embodiments, frame 101 has seven sides of approximately equal length (i.e., the two sides of the horizontal of the T-shape, the two undersides of the horizontal of the T-shape, the two sides of the vertical of the T-shape, and the one underside of the vertical of the T-shape), and one side that is longer than the rest (i.e., the upper side of the horizontal of the T-shape). In some embodiments, the seven sides are each about 20 in/cm long, and the one longer side is about 60-70 in/cm long.

Using the embodiment of device 100 wherein frame 101 has a T-shape, as shown in FIG. 1, the user could straddle his legs on either side of the smaller straight portion, with the elongated straight portion either in front of him or behind him, depending on whether the user wanted to practice dribbling in front of him or behind him, respectively, as well as between his legs. As discussed hereinbelow, frame 101 may have shapes other than a T.

Sound absorbing rebounding device 100 has a rebounding surface 103 that is intended to mimic or replace a hard surface on which a user would normally dribble, such as a hardwood floor, so as to cause a rebounding effect that is the same as, or is substantially similar to, that which would be provided by the hard surface. However, rebounding surface 103 is made from a material which allows the ball, when bounced thereon, to rebound with a reduced amount of noise as compared to when the ball is bounced on an average hardwood floor.

In some embodiments of the invention, as shown best in FIG. 1, rebounding surface 103 may be made of a plurality of interlocking cords. The interlocking cords may be made out of a material that allows the basketball to bounce but makes a reduced amount of noise. Without limitation, such material can be fibers or strands made from a fabric such as cotton, elastic material such as rubber, synthetic material such as polyester or nylon, or bungee or shock cords, which are made of one or more strands of an elastic material, usually rubber, bound together by a fabric covering that is abrasion resistant, such as nylon, polypropylene and polyethylene. In some embodiments, the cords may have a diameter of ¼" or ⅛", or in a range of from approximately ¼" to approximately ⅛" or 1/16".

The attachment of rebounding surface 103 to frame 101 may be done by any means known in the art. For example, as shown in FIG. 1, rebounding surface 103 may be attached to frame 101 by attaching the one or a plurality of cords to the frame 101 itself, e.g., by passages in the frame. In one embodiment, rebounding surface 103 is formed of one interlocking cord that is at one end thereof fixed into frame 101, threaded from top to bottom along frame 101, from one end of the frame 101 to the other end of frame 101, and then threaded from side to side along frame 101, from the top of frame 101 to bottom of frame 101 (or from the bottom of frame 101 to the top of frame 101), each time passing through an aperture in frame 101 on its way into frame 101 and passing through an aperture in frame 101 on its way out of frame 101, and finally at the other end thereof fixed into frame 101.

In another embodiment, two such cords can be so interlocked, for example, with one cord being threaded from top to bottom along frame 101, and another cord being threaded from side to side along frame 101. In yet another embodiment, more than two such cords can be so interlocked, for example, with more than one cord being threaded from top to bottom along frame 101, and more than one cord being threaded from side to side along frame 101. The more times that the cord or cords are threaded in and out of frame 101 and interlocked top/bottom and side/side, the more uniformity can be created over the rebounding surface 103 within the dribbling area.

In some embodiments, as a result of the elasticity of the plurality of cords, the basketball's returning energy can be substantially equal to that off an average hardwood floor. In some embodiments, the number, tension and elasticity of the plurality of cords can be set such that rebounding surface 103 may provide a rebounding effect substantially similar to than would be provided by a hard surface.

In some embodiments, the number, tension and elasticity of the plurality of cords can be set such that rebounding surface 103 may provide an even greater rebounding effect than would be provided by a hard surface, in order to provide the user with enhanced rebounding so as to make the user more aware of a bouncier ball, thereby improving the user's skill at dribbling. In these embodiments, as a result of the elasticity of rebounding surface 103, the basketball's returning energy can be greater than off the average hardwood floor.

In some embodiments, the number, tension and elasticity of the plurality of cords can be set such that rebounding surface 103 may provide a lesser rebounding effect than would be provided by a hard surface, in order to provide the user with worse rebounding so as to make the user work harder to make the ball rebound, thereby improving the user's skill at dribbling. In these embodiments, as a result of the elasticity of the rebounding surface 103, the basketball's returning energy can be less than off the average hardwood floor.

Once rebounding surface 103 is attached to frame 101, rebounding surface 103 will be spaced or distanced from the ground or support surface. In certain embodiments, base 105 of device 100 provides a separation or spacing of the rebounding surface 103 from the supporting surface on which device 100 rests, so that sounds and vibrations emanating from the basketball and device 100 during bouncing of the basketball are not transferred to the supporting surface. In some embodiments, the base provides damping for vibrations emanating from the rebounding device during bouncing of the basketball.

In certain embodiments, base 105 of device 100 may comprise two or more legs. As shown in FIG. 1, base 105 may comprise a plurality of blocks 105 that, in addition to being attached to frame 101, are appropriately spaced about the periphery of frame 101. These blocks 105 include one or more layers of a cushioning material that acts as a shock absorber to neutralize excessive energy and absorb vibration. The cushioning material may be any high density foam or padding as may be known in the art.

Blocks 105 may be stacked one upon another about the periphery of frame 101 so as to allow adjustment of the height of the dribbling area from the supporting surface or floor as desired by the user. One or more of blocks 105 may also have a bottom surface that is provided with additional or a higher degree of friction, so as to avoid slippage of device 100 relative to the supporting surface during use. In preferred embodiments, base 105 does not interfere with the rebounding effect of the rebounding surface 103.

In certain embodiments, rebounding surface 103 may be approximately 4"-10" off the ground or support surface. In other preferred embodiments, rebounding surface 103 may be approximately 1"-8", 2-7, and still more preferably 3"-6", off the ground or support surface. The distance of rebounding surface 103 off the ground or support surface can be adjusted by the user to provide the desired dribbling experience and to provide sufficient clearance underneath rebounding surface 103 so that rebounding surface 103 does not contact the ground or support surface during use.

Figure 2A:
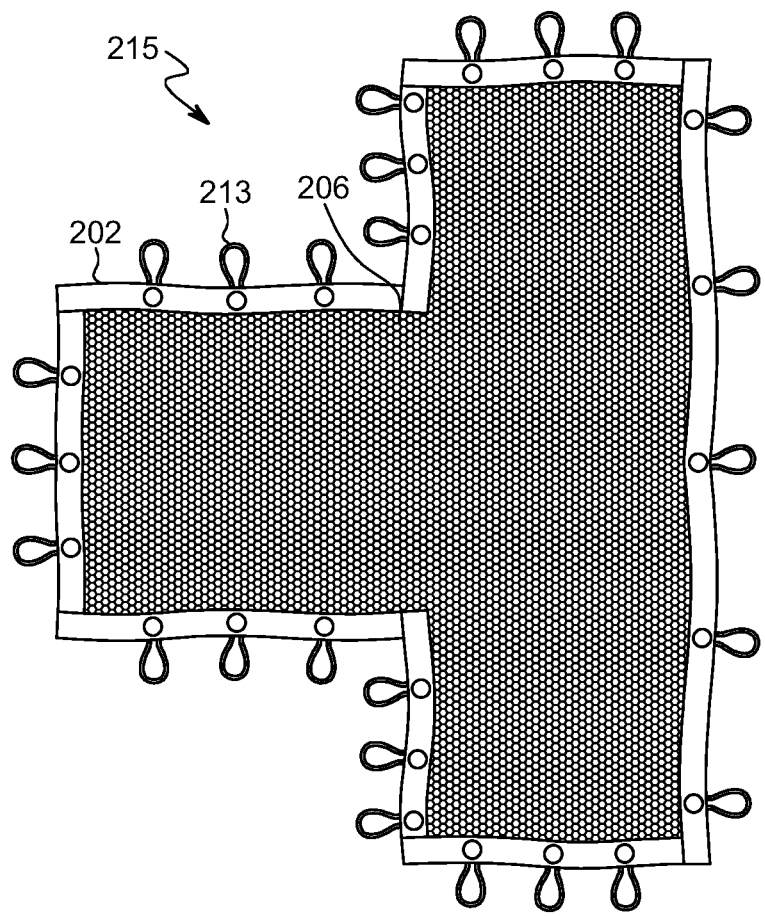
FIG. 2A is a top view of a sound absorbing rebounding surface, according to one embodiment of the invention.
Figure 2B:
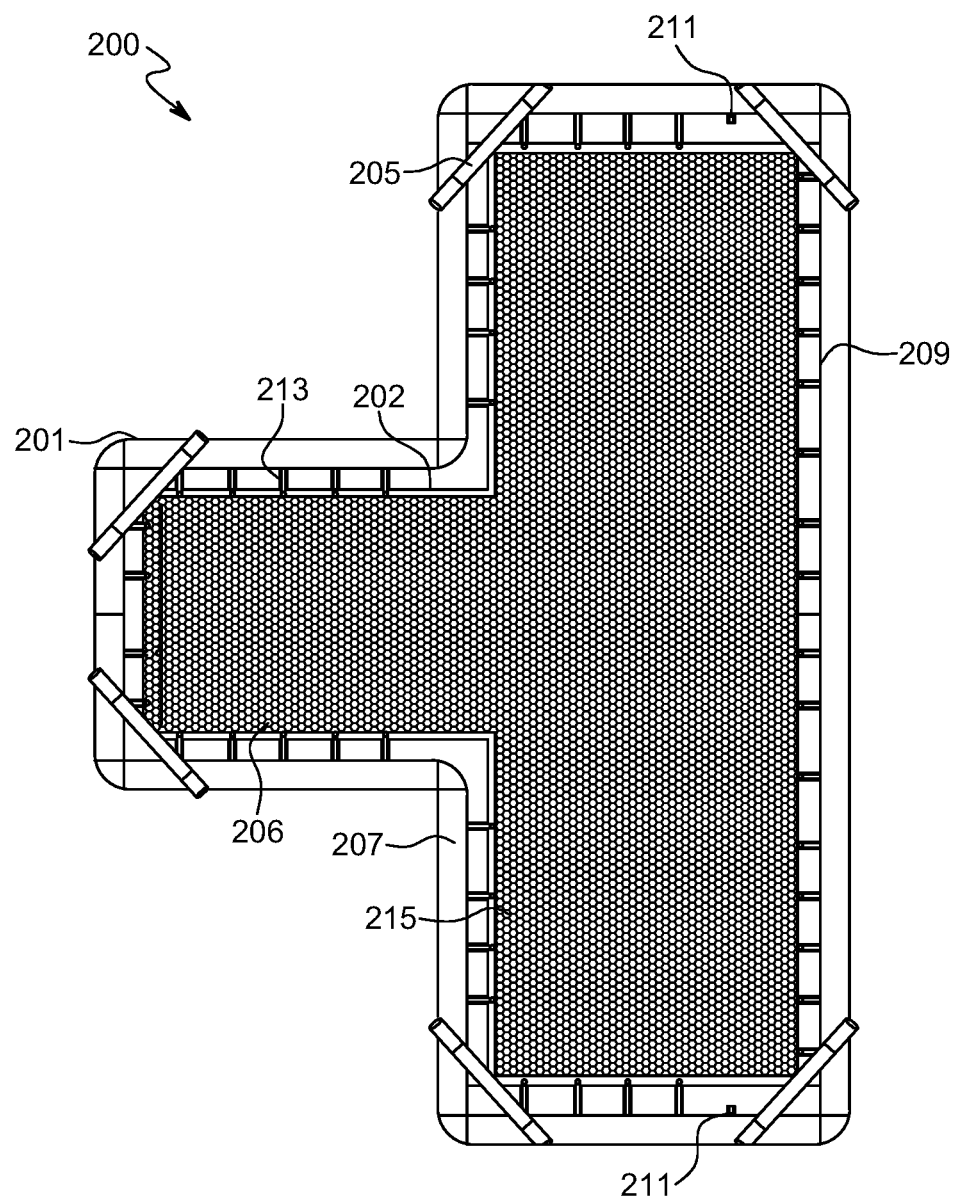
FIG. 2B is a bottom view of a sound absorbing rebounding device, according to one embodiment of the invention.

In another embodiment of the device 100, as shown in FIGS. 2A and 2B, the rebounding surface 215 may be made from a single piece of material that is attached to frame 201. The rebounding surface 215 may be made out of a material that allows the basketball to bounce but makes a reduced amount of noise, such as a tough, lightweight, elastic synthetic polymer. Without limitation, the material of rebounding surface 215 may comprise one or more of the fabrics discussed above, may be an elastic fabric, and may comprise an elastic or elasticized fabric coating, wherein the fabric returns to its initial shape and size when the bouncing forces are removed. Various types of elastic materials are included, such as elastic polyurethane fiber or fabric, commonly known as spandex, Lycra, Lycra spandex or Elastane; polyamides; nylon or stretch vinyl; a visco-elastic polymer known as Sorbothane® a cotton mesh fabric, a mesh polyester cotton fabric, or a polyester cotton mesh fabric. In some embodiments, the material of rebounding surface 215 may be formed with a mesh, and as such has a plurality of holes 206 formed therethrough, which holes 206 may have a variety of shapes, such as hexagon, diamond and circle. In some embodiments, rebounding surface 215 may also be made to appear like a hardwood floor, with a coating or colored design that provides a wood-like appearance.

In one embodiment, as shown in FIG. 2A, the single piece of material may have a border 202 that is sewn to the periphery of the sheet of material and to which a plurality of loops 213 may be affixed, which loops may be made from an elastic material, such as described above. In some embodiments, the loops may have a diameter of ¼" or ⅛", or in a range of from approximately ¼" to approximately ⅛". In some embodiments, border 202 and loops 213 may be made from a more resilient material than that of the material of which the rebounding surface 215 is made.

In another example, as shown in FIG. 2B, some embodiments of the sound absorbing rebounding device 200 may have a frame 201 with a plurality of hooks 211 attached to frame 201 at the inside surface 209 thereof. In some embodiments of the invention, the plurality of hooks 211 are made out of a hard material, such as metal or plastic, such as ethylene propylene diene monomer (EPDM) rubber. Hooks 211 may be attached to frame 201 through any known means, such as glue, soldering or welding. Rebounding surface 215 may be attached to the frame 201 by attaching the plurality of loops 213 to the frame 201 itself, e.g., by passages in the frame, or to the frame 201 via the plurality of hooks 211. In preferred embodiments, the number of loops 213 and hooks 211 are substantially identical.

In some embodiments, loops 213 may be made of an elastic material. In some embodiments, loops 213 are 4" loops, and are made for example of ¼" rubber or bungee cord material.

The tension at which rebounding surface 103 or 215 is attached to frame 101 or 201 may vary along the periphery of frame 101, 201. For example, the tension in loops 213 may be measured around the periphery of frame 201. In one embodiment, the tension ranges from about 4 lbs. to about 11 lbs., preferably about 5-8 lbs.

The amount that rebounding surface 103 or 215 flexes relative to frame 101 or 201 depends upon how rebounding surface 103 or 215 is attached to frame 101 or 201 and the tension with which it is attached. For example, if there are fewer hooks 211 and loops 213, or if loops 213 are longer or have greater elasticity, or if the tension in such loops is lower, then rebounding surface 215 may tend to flex more and provide less of a bounce to the basketball. Conversely, how rebounding surface 103 or 215 is attached to frame 101 or 201 and the tension with which it is attached will determine the amount that rebounding surface 103 or 215 flexes relative to frame 101 or 201 and the amount of bounce that rebounding surface 103 or 215 provides. Thus, if there are more hooks 211 and loops 213, or if loops 213 are shorter or have less elasticity, or if the tension in such loops is higher, then rebounding surface 215 may tend to be tighter and flex less and may tend to provide more of a rebound to a ball bounced thereon.

Device 200 also has a plurality of legs or stands 205 that are attached to frame 201 at the outer corners of frame 201 to support frame 201 and to space it from the support surface on which device 200 rests when in use. Legs or stands 205 can have any configuration that is known in the art, such as blocks, posts, triangular, U-shaped, etc. In the embodiment shown on FIG. 2B, stands 205 are oriented at a 45° angle with respect to the corners of frame 201, although other angles are possible. In FIG. 2B, six (6) stands 205 are shown, but more or fewer stands 205 may be used as necessary.

In certain embodiments, stands 205 may be provided with one or more layers of a cushioning material that act as a shock absorber to neutralize excessive energy and to absorb vibration from device 200 and prevent it from passing onto the support surface on which device 200 rests when in use. The cushioning material may be any high density foam or padding as may be known in the art, such as poly-fill (polyester fiberfill). One or more of stands 205 may also have a bottom surface that is provided with additional or a higher degree of friction, so as to avoid slippage of device 200 relative to the supporting surface during use.

The plurality of stands 205 can be made from the same or different material that frame 301 is made, such as metal, e.g., steel, iron, aluminum or Aluminum alloy, such as Aluminum alloy 5052 H34.

FIGS. 3A-D show various views of a collapsible sound absorbing rebounding device 300, according to an embodiment of the invention.

As shown in FIGS. 3A-D, the sound absorbing rebounding device 300 may have a collapsible frame 301, a rebounding surface 303, and a plurality of legs or stands 305. As viewed in FIG. 3A, which is a bottom view of a collapsible sound absorbing rebounding device 300 in an uncollapsed state, collapsible frame 301 may have a plurality of hooks 309 attached to an inside surface 311 of the collapsible frame 301, which attachment to frame 301 may be through any known means, such as glue, soldering or welding. Rebounding surface 303 may have a plurality of loops 320 about its periphery by which rebounding surface 303 may be attached to hooks 309 of collapsible frame 301.

In the embodiment of FIGS. 3A-D, frame 301 has a T-shape, similar to that of frame 201 in FIG. 2B. However, while frame 301 is similar in shape to the noncollapsible frame 201 in FIG. 2B, frame 301 has a folding structure that allows frame 301 to be collapsed or folded. In some embodiments of the invention, hinges 307 are situated at various locations along frame 301 to allow it to be collapsed or folded along one or more straight lines in various ways.

Figure 3A:
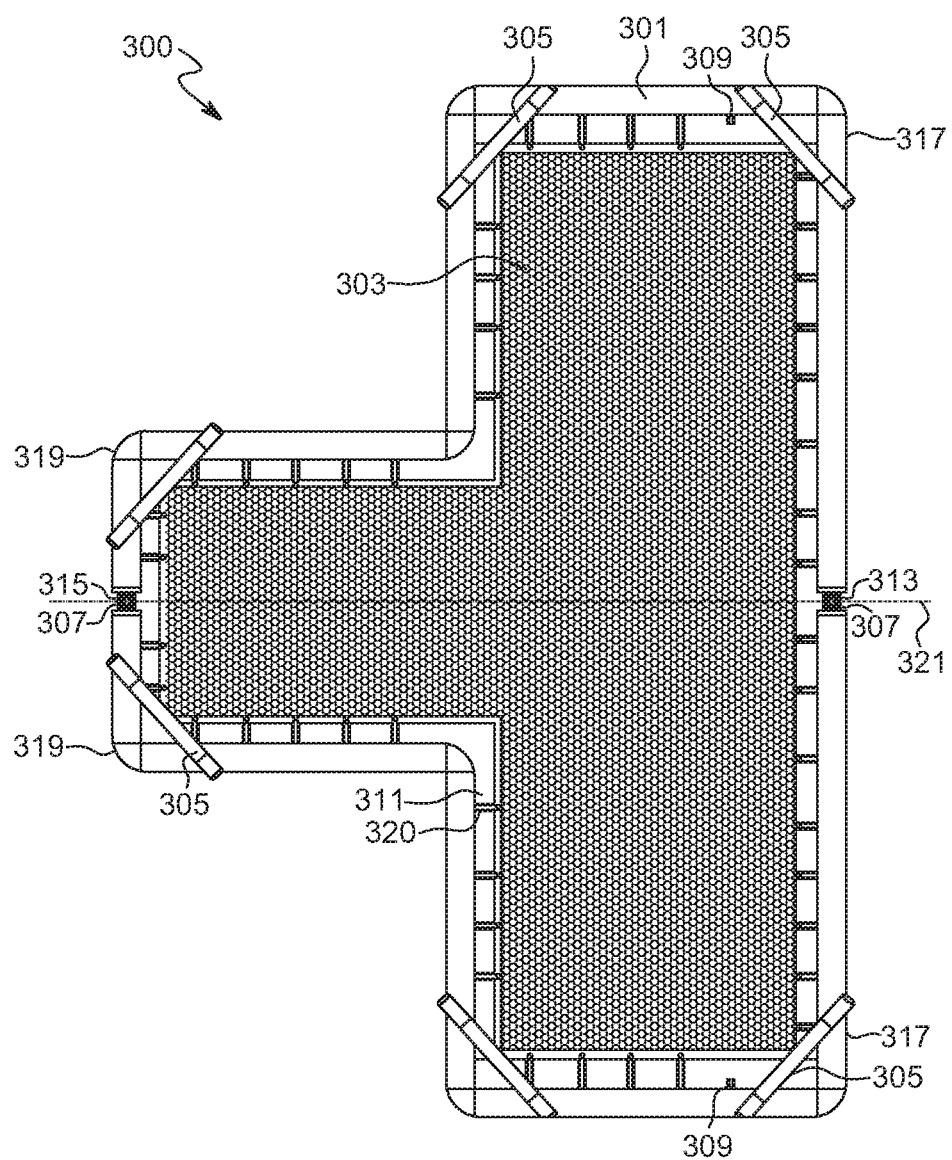
FIG. 3A is a bottom view of a collapsible sound absorbing rebounding device in an uncollapsed state, according to one embodiment of the invention.
Figure 3B:
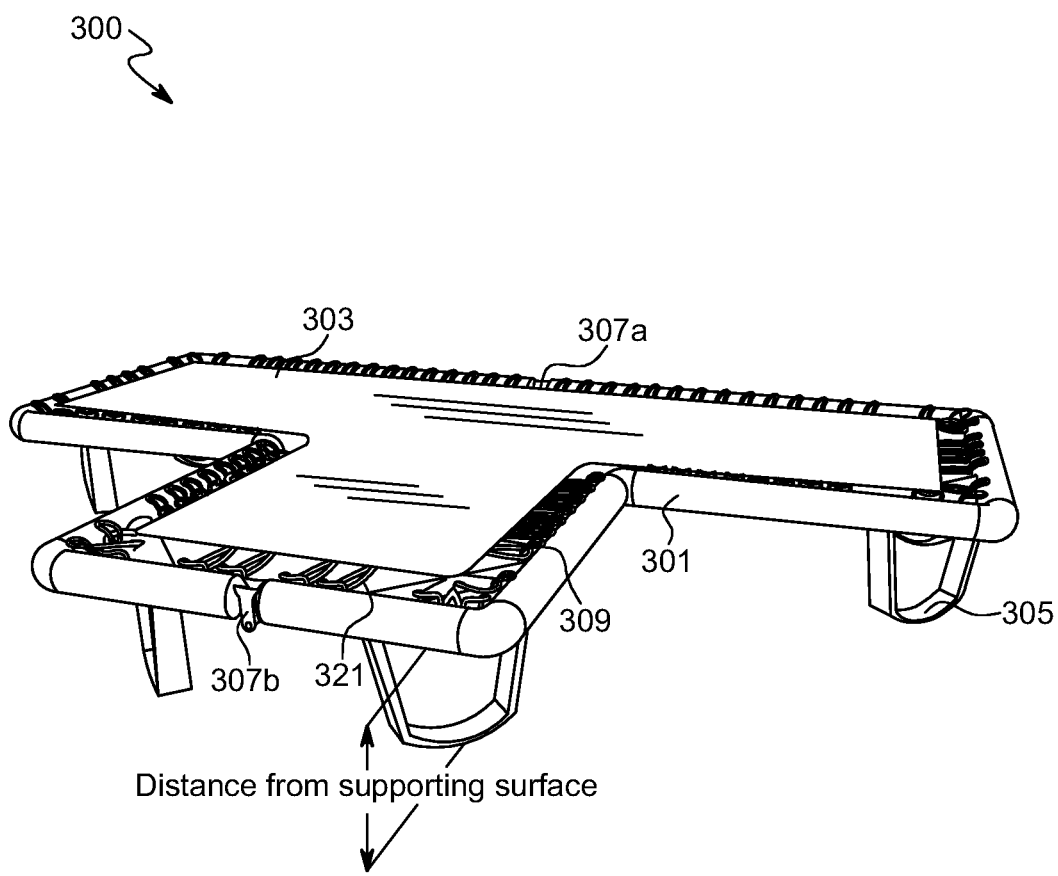
FIG. 3B is a perspective view of a collapsible sound absorbing rebounding device in an uncollapsed state, according to one embodiment of the invention.
Figure 3C:
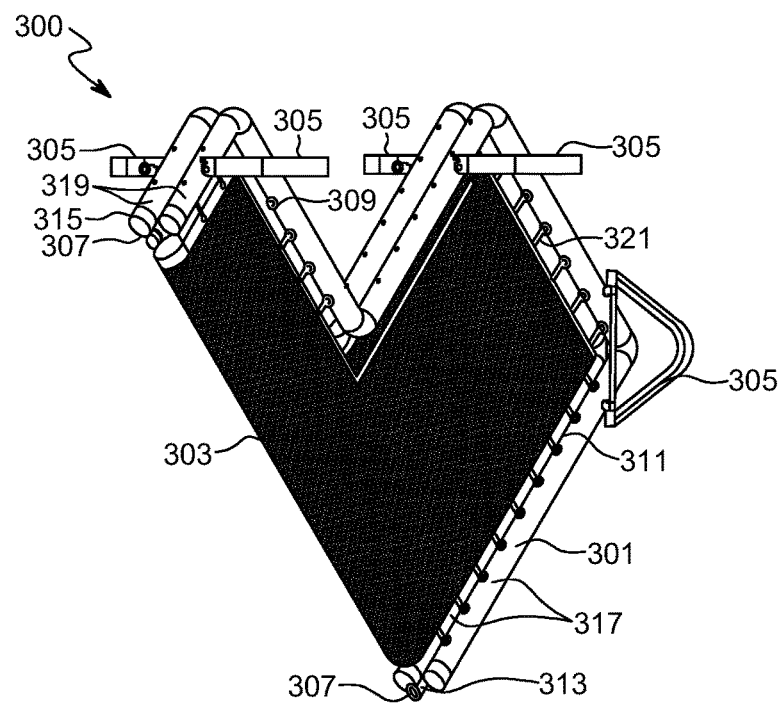
FIG. 3C is a perspective view of a collapsible sound absorbing rebounding device in a collapsed state with an unfolded stand, according to one embodiment of the invention.

For example, frame 301 is collapsible and may be folded from the open, uncollapsed configuration shown in FIGS. 3A and 3B to the collapsed configuration shown in FIG. 3C. In this embodiment, one of hinges 307 (hinge 307a) is located at a first midpoint 313 of a first section 317 of the collapsible frame 301, i.e., within the top frame segment of the elongated horizontal portion of the T-shape, and the other of hinges 307 (hinge 307b) is located at a second midpoint 315 of a second section 319 of the collapsible frame 301, i.e., within the bottom frame segment of the smaller, perpendicular portion of the T-shape. In some embodiments, one or more of hinges 307 are made from 1023 carbon steel or AISI '4340 Steel.

Figure 3D:
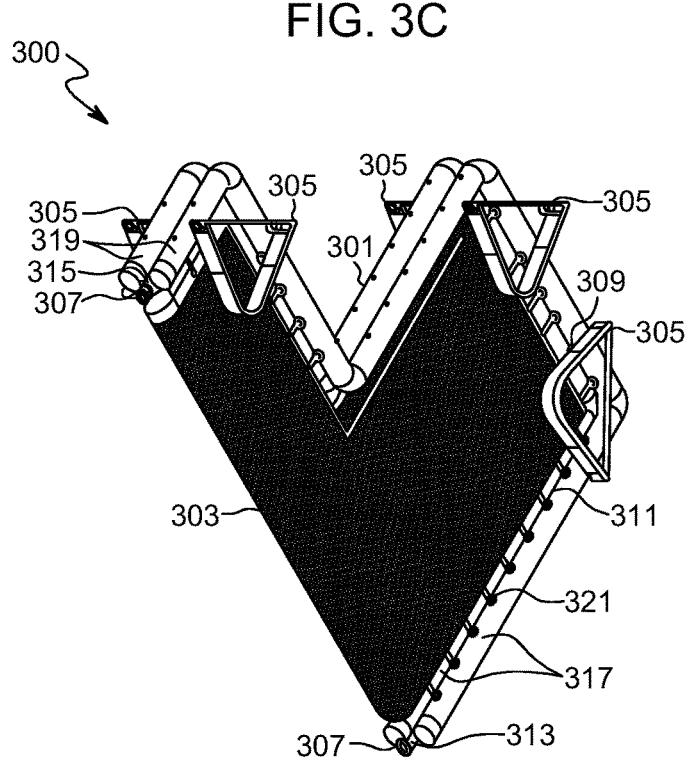
FIG. 3D is a perspective view of a collapsible sound absorbing rebounding device in a collapsed state with a folded stand, according to one embodiment of the invention.

The embodiment of the collapsible sound absorbing rebounding device 300 shown in FIG. 3A has a folding axis 321, which crosses both the first midpoint 313 and second midpoint 315. As shown in FIGS. 3C and 3D, in some embodiments of the invention, collapsible sound absorbing rebounding device 300 can fold upon itself along the axis 321 via hinges 307. When device 300 is folded along folding axis 321, rebounding surface 303 is also folded along folding axis 321.

In certain embodiments, such as when frame 301 is collapsible and may be folded from the open, uncollapsed configuration to the collapsed configuration, the legs or stands 305 may also be collapsible. In FIG. 3C, the perspective view of the collapsible sound absorbing rebounding device 300 in a collapsed state, stands 305 are shown protruding outward in an unfolded state, as they were when they were deployed for use, as in FIG. 3B. As shown in FIG. 3D, stands 305 are attached to, and may be folded against, rebounding surface 303 via hinges (not identified) from an unfolded state (FIG. 3C) to a folded state (FIG. 3D). In the embodiment shown, stands 305 have a triangular shape and are oriented at 45° relative to the frame 301, although other configurations and orientations are contemplated. In one embodiment, as shown in FIG. 3D, stands 305 fold inward towards the center of rebounding surface 303. In another embodiment (not shown), stands 305 may fold outward towards the corners of frame 301.

When used, device 100, 200, 300 may be placed in its open, unfolded configuration on the floor or other support surface, with base 105 or stands 305 open and extended downward. When device 100 has a T-shape, the user straddles his legs on either side of the smaller straight portion, with the elongated straight portion either in front of him or behind him, depending on whether the user wants to practice dribbling in front of him or behind him, respectively, as well as between his legs. Once folded along folding axis 321 into its collapsed state, and stands 305 are folded against frame 301, device 300 can be carried or stored in a more compact configuration than in its uncollapsed, deployed state.

Figure 4:
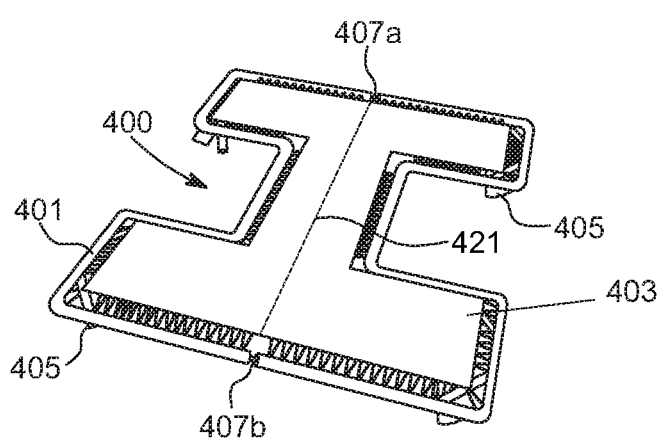
FIG. 4 is a perspective view of another embodiment of a collapsible sound absorbing rebounding device in an uncollapsed state, according to an embodiment of the invention.

In another embodiment of the sound absorbing rebounding device, as shown in FIG. 4, frame 401 may have an H-shape, i.e., with two elongated vertical side portions and a smaller, horizontal middle portion oriented perpendicularly to the two elongated straight portions at about a midpoint of each. Using such an embodiment, when device 100 has an H-shape, the user could straddle his legs on either side of the smaller middle portion, with the elongated portions in front of him and behind him, so that the user can practice dribbling in front of him and behind him, respectively, as well as between his legs.

Rebounding device 400 shown in FIG. 4 is similar to rebounding device 301 shown in FIGS. 3A-3D, except that it has an H-shape instead of a T-shape as in FIGS. 3A-3D. Frame 401 has a collapsible, folding structure that allow frame 401 to be collapsed or folded. In some embodiments of the invention, as shown in FIG. 4, hinges 407a and 470b are situated at locations along frame 401 to allow it to be collapsed or folded in half along a straight line. For example, frame 401 is collapsible and may be folded from the open, uncollapsed configuration shown in FIG. 4 to a collapsed configuration (not shown but similar to that shown in FIG. 3C). In this embodiment, one of the hinges (hinge 407a) is located at a midpoint of a first section of the collapsible frame 401, i.e., within the side frame segment of a first elongated vertical portion of the H-shape, and another of the hinges (hinge 407b) is located at a midpoint of a second section of the collapsible frame 401, i.e., within the side frame segment of a second elongated vertical portion of the H-shape.

In the embodiment of the collapsible sound absorbing rebounding device 400 shown in FIG. 4, frame 401 has a folding axis 421 that crosses the midpoints of the side frame segments of the elongated vertical portions of the H-shape, such that collapsible sound absorbing rebounding device 400 can fold upon itself along axis 421 via hinges 407a and b. When frame 401 is folded along folding axis 421, rebounding surface 403 is also folded along folding axis 421, and device 400 is folded in half. Stands 405 may be folded against frame 401, for example in a manner similar to the collapsing of stands 305 against frame 301, as discussed above with regard to FIGS. 3C and 3D.

FIGS. 5A-5C show another embodiment of the H-shaped collapsible sound absorbing rebounding device, but with a different placement of hinges and a different folding method. In FIGS. 5A-5C, device 500 is shown without a rebounding surface attached to frame 501 in order to better illustrate the folding of frame 501. As opposed to the H-shaped collapsible sound absorbing rebounding device 400 shown in FIG. 4, which has two hinges 407 such that device 400 folded into two halves, the H-shaped collapsible sound absorbing rebounding device 500 shown in FIG. 5A has four hinges 517a, 517b, 527a and 527b, each placed at a juncture within frame 501 between the two elongated vertical side portions and the smaller, horizontal middle portion oriented perpendicularly to the two elongated straight portions, such that device 500 is able to be folded into thirds.

In the embodiment of the collapsible sound absorbing rebounding device 500 shown in FIG. 5A, frame 501 has two folding axes—a first axis 521a that is coincident with or parallel to the inside frame elements of the left elongated vertical side portion, and a second axis 521b that is coincident with or parallel to the inside frame elements of the right elongated vertical side portion, such that collapsible sound absorbing rebounding device 500 can fold upon itself along these two axes via hinges 517a and 517b, and hinges 527a and 527b, respectively. When frame 501 is folded along these folding axes, rebounding surface is also folded along these folding axes, and device 501 is folded in thirds.

For example, as shown in FIGS. 5A-5B, the left elongated vertical side portion may be folded along axis 521a under (or over) the smaller, horizontal middle portion via hinges 517a and 517b. Then, as shown in FIGS. 5B-5C, the right elongated vertical side portion may be folded along axis 521b over (or under) the smaller, horizontal middle portion via hinges 527a and 527b.

As discussed previously, when frame 501 is collapsible and may be folded from the open, uncollapsed configuration to the collapsed configuration, its legs or stands 505 may also be collapsible. Stands 505 are shown in FIG. 5A protruding outward in an unfolded state as deployed for use, and stands 505 are shown in FIGS. 5B and 5C still protruding outward, even though frame 501 is shown in a partially collapsed configuration in FIG. 5B and in a fully collapsed configuration in FIG. 5C. FIG. 5C shows stands 505 nested against each other when the left and right elongated vertical side portions are folded under (or over) the smaller, horizontal middle portion. However, stands 505 may also be attached to and folded against frame 501 via hinges (not identified), for example in a manner as described above, so that frame 501 may be placed in a more compact configuration when collapsed.

Once frame 501 of device 500 has been folded along folding axes 521a and 521b into its collapsed state, as shown in FIG. 5C, device 500 can be carried or stored in a more compact configuration than in its uncollapsed, deployed state, as shown in FIG. 5A. In addition, the collapsed configuration of device 500 as shown in FIG. 5C is even more compact than the collapsed configuration of device 300 shown in FIGS. 3C and 3D, and more compact than the collapsed configuration of device 400 shown in FIG. 4 would collapse into.

Figure 6A:
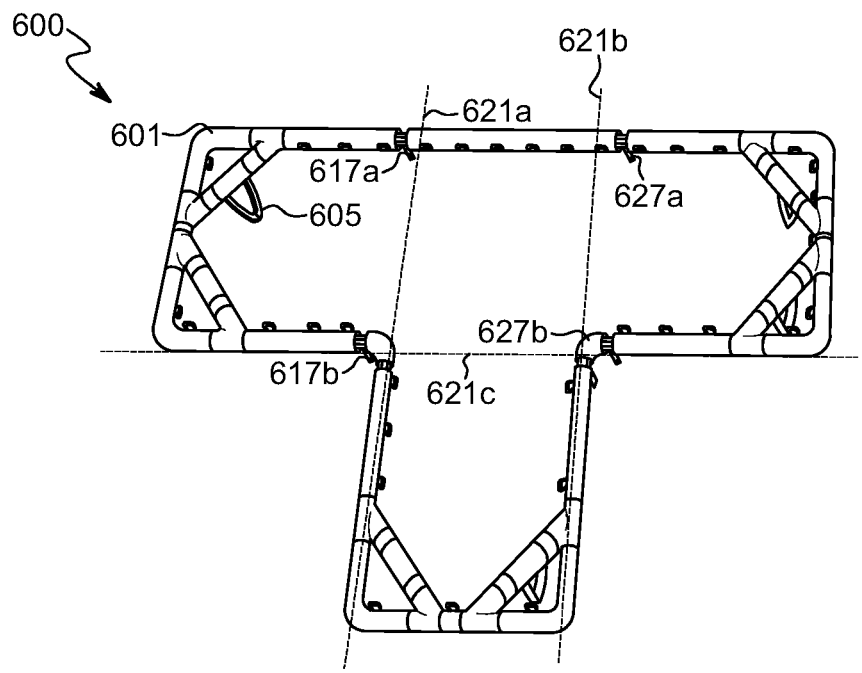
FIGS. 6A-E are perspective views of the frame of another embodiment of the collapsible sound absorbing rebounding device in successively collapsed states.

FIGS. 6A-6E show another embodiment of the collapsible sound absorbing rebounding device, this one having a T-shape as shown in FIGS. 3 and 4, but with a different placement of hinges and a different folding method than shown in FIGS. 3 and 4. In FIG. 6A, the placement of hinges and method folding are more similar to those as shown in FIGS. 5A-C. Namely, as opposed to the T-shaped collapsible sound absorbing rebounding device 300 shown in FIGS. 3A-D, which has two hinges 307a and 307b such that device 300 folds into two halves, the T-shaped collapsible sound absorbing rebounding device 600 shown in FIG. 6A has four hinges 617a, 617b, 627a and 627b, each placed at a juncture within frame 601 to allow frame 601 to fold into a most compact state.

In the embodiment of the collapsible sound absorbing rebounding device 600 shown in FIG. 6A, frame 601 has three folding axes—a first axis 621a that is coincident with or parallel to the left frame element of the short vertical portion (the bottom of the T shape), a second axis 621b that is coincident with or parallel to the right frame element of the short vertical portion (the bottom of the T shape), and a third axis 621c that is coincident with or parallel to the lower frame elements of the elongated horizontal portion (the top of the T shape), such that collapsible sound absorbing rebounding device 600 can fold upon itself along these three axes via hinges 617a and 617b, hinges 627a and 627b, and hinges 617b and 627b, respectively, as described below. When frame 601 is folded along these folding axes, the rebounding surface (not shown) is also folded along these folding axes, and frame 601 of device 600 is folded into a square.

Figure 6B:
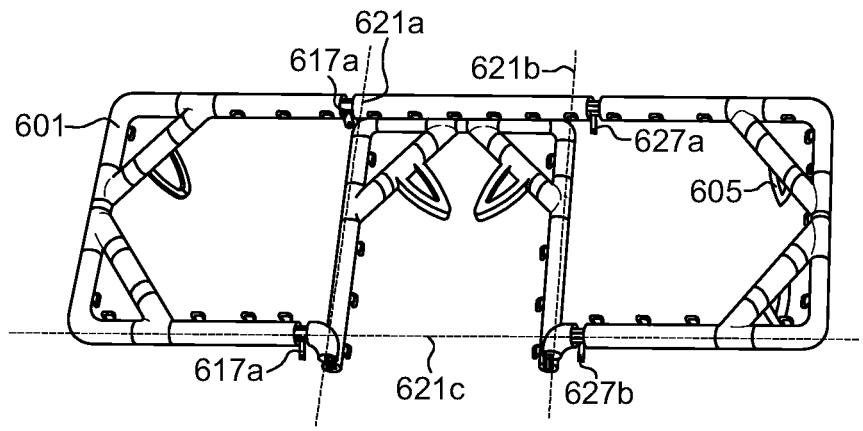
Figure 6C:
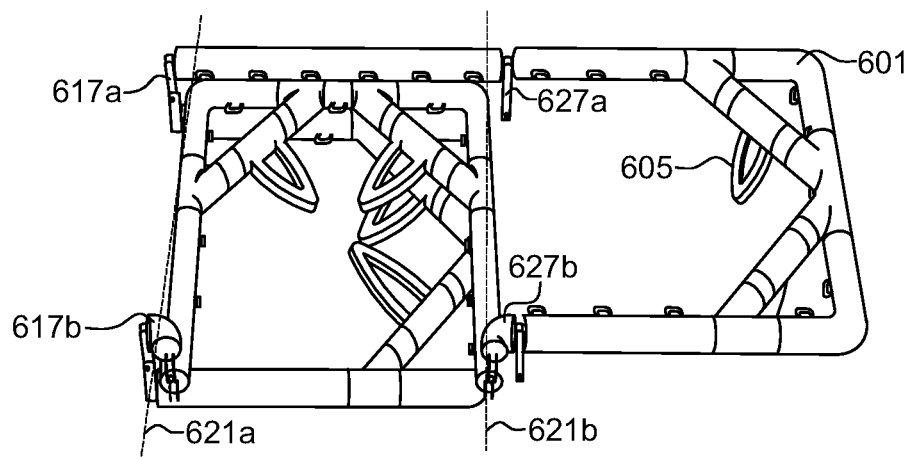
Figure 6D:
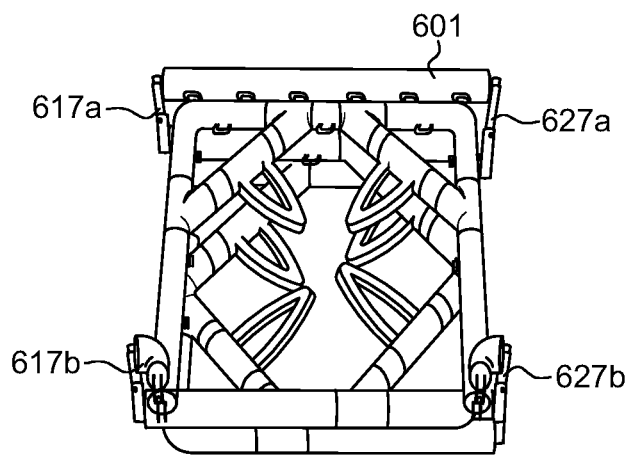

For example, as shown in FIGS. 6A-6B, the short vertical portion (the bottom of the T shape) may be folded along axis 621c under (or over) the elongated horizontal top portion of the T shape via hinges 617b and 627b. Next, as shown in FIGS. 6B-6C, the left portion of the elongated horizontal top portion (the top of the T shape) may be folded along axis 621a under (or over) the smaller, middle portion of the elongated horizontal top portion via hinges 617a and 617b. Then, as shown in FIGS. 6C-6D, the right portion of the elongated horizontal top portion (the top of the T shape) may be folded along axis 621b over (or under) the smaller, middle portion of the elongated horizontal top portion via hinges 627a and 627b. These folds may be made in any other order as desired and not necessarily in the order described.

As discussed previously, when frame 601 is collapsible and may be folded from the open, uncollapsed configuration to the collapsed configuration, its legs or stands 605 may also be collapsible. Stands 605 are shown in FIG. 6A protruding outward in an unfolded state as deployed for use, and stands 605 are shown in FIGS. 6C and 6D protruding inward in a collapsed configuration when frame 601 is shown in a partially collapsed configuration in FIG. 6C and in a fully collapsed configuration in FIG. 6D. Stands 605 may also be attached to and folded against frame 601 via hinges (not identified), for example in a manner as described above, so that frame 601 may be placed in a more compact configuration when collapsed. As shown in FIGS. 6A-6D, however, stands 605 may be formed as protruding supports that rotate on a cross bar that is affixed to frame 601, and may rotate from an unfolded state as deployed for use, as shown in FIG. 6A, and a folded state in a collapsed configuration, as shown in FIGS. 6C and 6D. In certain embodiments, stands 601 may be rotated to a collapsed configuration in which they are substantially against or within the frame 601. In certain embodiments, the cross bar is affixed to frame 601 at a 45° angle, although other angles are possible.

Figure 6E:
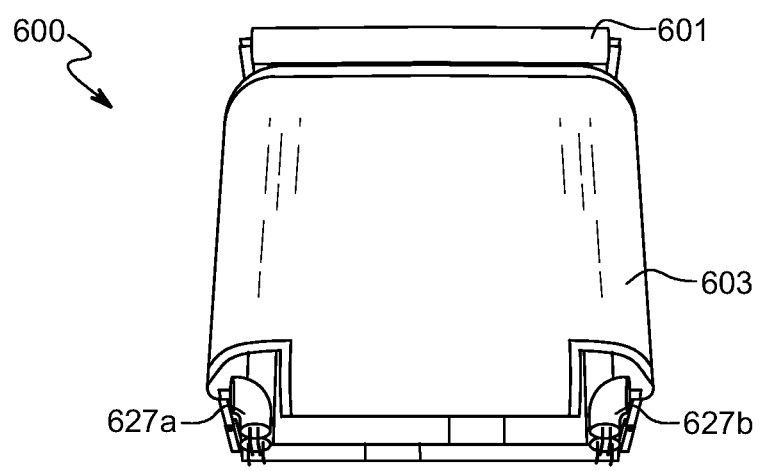

In FIGS. 6A-6D, device 600 is shown without a rebounding surface attached to frame 601 in order to better illustrate the folding of frame 601. FIG. 6E shows the same fully collapsed or folded configuration as in FIG. 6D, but with rebounding surface 603 attached to frame 607.

Once frame 601 of device 600 has been folded along folding axes 621a, 621b and 621c into its collapsed state, as shown in FIGS. 6D/6E, device 600 can be carried or stored in an even more compact configuration than in its uncollapsed, deployed state, as shown in FIG. 6A. In addition, the collapsed configuration of device 600 as shown in FIGS. 6D/6E is even more compact than the collapsed configuration shown of device 300 in FIGS. 3C/3D, more compact than the collapsed configuration of device 400 shown in FIG. 4 would collapse into, and still more compact than the collapsed configuration of device 500 shown in FIG. 5C.

It should be noted that, as shown best in FIGS. 6A-6D, frame 601 has specially designed hinges 617b and 627b at the junctures between the left and right lower frame elements of the elongated horizontal portion (the top of the T shape) and the left and right frame elements of the short vertical portion (the bottom of the T shape), respectively. In preferred embodiments, hinges 617b and 627b permit a rotation about a horizontal axis and also permit a rotation about a vertical axis. Specifically, hinges 617b and 627b allow the short vertical portion (the bottom of the T shape) to be folded under (or over) the elongated horizontal top portion of the T shape about horizontal axis 621c (FIG. 6B), while also allowing the left and right portions of the elongated horizontal top portion (the top of the T shape) to be folded under (or over) the smaller, middle portion of the elongated horizontal top portion about vertical axes 621a and 621b, respectively (FIGS. 6C and 6D).

In addition, in preferred embodiments, hinges 617b and 627b also allow the portions of frame 601 being rotated to, after their rotation, be displaced around other portions of frame 601. In such an embodiment, the rotated portions are extended via hinges 617b and 627b to allow them to be swung around a portion of frame 601 that would otherwise prevent the rotated portion of frame 601 to rest flat. Specifically, once the short vertical portion (the bottom of the T shape) has been folded under (or over) the elongated horizontal top portion of the T shape (FIG. 6B), the left or right portion of the elongated horizontal top portion (the top of the T shape) may then folded under (or over) the smaller, middle portion of the elongated horizontal top portion in a way that the short vertical portion (the bottom of the T shape) that has already been folded under (or over) the elongated horizontal top portion of the T shape does not interfere. Even further, the second of the left or right portion of the elongated horizontal top portion (the top of the T shape) that hasn't yet been folded may then folded under (or over) the smaller, middle portion of the elongated horizontal top portion in a way that this folding motion is not interfered with neither by the short vertical portion (the bottom of the T shape) that has already been folded under (or over) the elongated horizontal top portion of the T shape nor by the first of the left or right portion of the elongated horizontal top portion (the top of the T shape) that has already been folded under (or over) the smaller, middle portion of the elongated horizontal top portion.

In another embodiment of the sound absorbing rebounding device (not shown), the frame may have a shape of a closed letter H (similar to the letter B or the number 8), i.e., with two elongated straight side portions and three smaller straight middle portions oriented perpendicularly to the two elongated straight portions, one at about a midpoint of each and the other two smaller portions on the two ends. Using such an embodiment, when the device has the shape of a closed letter H (similar to the letter B or the number 8), the user could straddle his legs on either side of the middle portion, with the elongated side portions in front of him and behind him, and with the other smaller portions on the outsides of his legs, so that the user can practice dribbling in front of him, behind him, between his legs, and around his legs. The ball is then bounced on the rebounding surface as needed. Such an embodiment can be collapsed by any of the means described hereinabove.

Thus, a sound absorbing rebounding device for use in practicing to dribble a basketball has been provided. One skilled in the art will appreciate that the present invention can be practiced by other than the described embodiments, which are presented for purposes of illustration and not limitation. In addition, different embodiments are disclosed herein, and features of certain embodiments may be combined with features of other embodiments, such that certain embodiments maybe combinations of features of multiple embodiments. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

The invention claimed is:

1. A sound absorbing rebounding device comprising:
a frame enclosing a dribbling area;
a base attached to the frame and configured to space the frame from a supporting surface on which the device rests, wherein the frame is configured such that the dribbling area has a T-shape comprising a horizontal section and a vertical section, a first end of which is arranged at an approximate midpoint of the horizontal section; and
a rebounding surface attached to the frame and extending across the dribbling area, wherein the rebounding surface is made from a material which allows a ball, when bounced thereon, to rebound with a reduced amount of noise as compared to when the ball is bounced on an average hardwood floor.

2. The sound absorbing rebounding device of claim 1, wherein a portion of the frame is configured to be placed between a user's legs and a portion of the frame is configured to be placed in front of and/or behind the user's legs.

3. The sound absorbing rebounding device of claim 2, wherein the frame is configured such that the dribbling area has an H-shape comprising the T-shape and further comprising an additional horizontal section, wherein a second end of the vertical section is arranged at an approximate midpoint of the additional horizontal section, or a closed H-shape comprising the H-shape further comprising a first additional vertical section arranged between a first end of the horizontal section and a first end of the additional horizontal section and a second additional vertical section arranged between a second end of the horizontal section and a second end of the additional horizontal section.

4. The sound absorbing rebounding device of claim 1, wherein the base comprises a plurality of legs.

5. The sound absorbing rebounding device of claim 1, wherein the base has a cushioning to absorb vibrations caused by the ball when bounced on the rebounding surface.

6. The sound absorbing rebounding device of claim 1, wherein the base has a friction surface to prevent the base from sliding on the supporting surface when the ball is bounced on the rebounding surface.

7. The sound absorbing rebounding device of claim 1, wherein an attachment of the rebounding surface to the frame is capable of being adjusted so as to provide the ball bounced on the rebounding surface with an equal returning energy as compared with the ball bounced on an average hardwood floor.

8. The sound absorbing rebounding device of claim 1, wherein an attachment of the rebounding surface to the frame is capable of being adjusted so as to provide the ball bounced on the rebounding surface with a greater returning energy as compared with the ball bounced on an average hardwood floor.

9. The sound absorbing rebounding device of claim 1, wherein an attachment of the rebounding surface to the frame is capable of being adjusted so as to provide the ball bounced on the rebounding surface with a lower returning energy as compared with the ball bounced on an average hardwood floor.

10. The sound absorbing rebounding device of claim 1, wherein the rebounding surface comprises a plurality of interlocking elastic cords.

11. The sound absorbing rebounding device of claim 1, wherein the rebounding surface comprises an elastic fabric.

12. The sound absorbing rebounding device of claim 1, wherein:
the frame has a plurality of hooks attached thereto;
the rebounding surface has a plurality of loops attached to a periphery thereof; and
wherein the rebounding surface can be attached to the frame by attaching the plurality of loops to the plurality of hooks.

13. The sound absorbing rebounding device of claim 12, wherein the plurality of loops are formed from an elastic material.

14. The sound absorbing rebounding device of claim 1, further comprising a plurality of hinges within said frame.

15. The sound absorbing rebounding device of claim 14, wherein said frame is configured to be folded by way of said hinges.

16. A sound absorbing rebounding device comprising:
a frame enclosing a dribbling area, wherein said dribbling area has a T-shape comprising an elongated horizontal section and a short vertical section arranged at an approximate midpoint of the elongated horizontal section;
a base attached to the frame and configured to space the frame from a supporting surface on which the device rests; and
a rebounding surface attached to the frame and extending across the dribbling area, wherein the rebounding surface is made from a material which allows a ball, when bounced thereon, to rebound with a reduced amount of noise as compared to when the ball is bounced on an average hardwood floor.

17. The sound absorbing rebounding device of claim 16, wherein the short vertical section is configured to be placed between a user's legs and the elongated horizontal section is configured to be placed in front of or behind the user's legs.

18. The sound absorbing rebounding device of claim 16, wherein the dribbling area has an H-shape further comprising a second elongated horizontal section arranged at an approximate midpoint thereof with respect to the short vertical section but at an opposite end of the short vertical section than the first elongated horizontal section.

19. The sound absorbing rebounding device of claim 18, wherein the short vertical section is configured to be placed between a user's legs and the two elongated horizontal sections are configured to be placed in front of and behind the user's legs.

20. The sound absorbing rebounding device of claim 18, further comprising a plurality of hinges within said frame.

21. The sound absorbing rebounding device of claim 20, wherein said hinges are situated in said frame at corners thereof between the two elongated horizontal sections and the short vertical section to allow said frame to be folded in thirds.

22. The sound absorbing rebounding device of claim 16, further comprising a plurality of hinges within said frame.

23. The sound absorbing rebounding device of claim 22, wherein said frame is configured to be folded by way of said hinges.

24. The sound absorbing rebounding device of claim 22, wherein said hinges are situated in said frame above the elongated horizontal section and below the short vertical section to allow said frame to be folded in half.

25. The sound absorbing rebounding device of claim 22, wherein two said hinges are situated in said frame above the elongated horizontal section and other of said hinges are situated at corners between the elongated horizontal section and the short vertical section, to allow said frame to be folded into a square.

26. The sound absorbing rebounding device of claim 25, wherein said hinges situated at corners between the elongated horizontal section and the short vertical section allow flexing of said frame about two axes.

27. The sound absorbing rebounding device of claim 16, wherein the rebounding surface comprises a plurality of interlocking elastic cords.

28. The sound absorbing rebounding device of claim 16, wherein the rebounding surface comprises an elastic fabric.

29. The sound absorbing rebounding device of claim 16, wherein the base comprises a plurality of legs.

30. The sound absorbing rebounding device of claim 27, wherein the plurality of legs are configured to be moved from a deployed configuration to a folded configuration in which they are substantially flat against or within the frame.

* * * * *

UNITED STATES PATENT AND TRADEMARK OFFICE
CERTIFICATE OF CORRECTION

| | | |
|---|---|---|
| PATENT NO. | : 9,844,713 B1 | Page 1 of 1 |
| APPLICATION NO. | : 15/494771 | |
| DATED | : November 8, 2016 | |
| INVENTOR(S) | : Pine et al. | |

It is certified that error appears in the above-identified patent and that said Letters Patent is hereby corrected as shown below:

On the Title Page

(72) Inventors, please add:
Marc Forkosh Woodmere, NY (US)

Signed and Sealed this
Third Day of September, 2019

Andrei Iancu
*Director of the United States Patent and Trademark Office*